Figure 1:
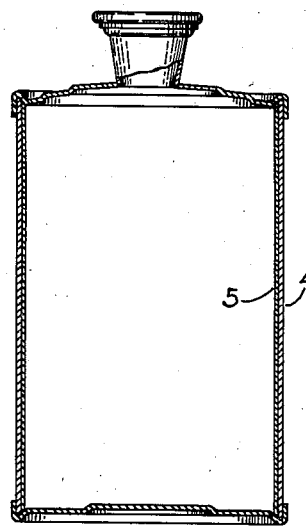

Oct. 20, 1936.  F. W. NITARDY  2,058,250
TREATMENT AND PACKAGING OF ETHER
Filed July 1, 1932

Ferdinand W. Nitardy
INVENTOR.

BY Frank Wilen

ATTORNEY.

Patented Oct. 20, 1936

2,058,250

UNITED STATES PATENT OFFICE 2,058,250

TREATMENT AND PACKAGING OF ETHER

Ferdinand W. Nitardy, Brooklyn, N. Y., assignor to E. R. Squibb & Sons, New York, N. Y., a corporation of New York Application July 1, 1932, Serial No. 620,427

7 Claims. (Cl. 23—230)

This invention relates to the treatment and packaging of ether to remove oxygen therefrom and thus to prevent the formation of oxidative impurities therein.

Ether deteriorates by reacting with oxygen to form peroxides, which in turn by interaction and/or decomposition yield aldehydes and other substances. Herein the term "oxidative impurities" embraces all such peroxides, aldehydes, and related contaminating products. This deterioration increases, of course, with lapse of time, and is favored by the following circumstances: the presence, which is usual, of dissolved oxygen in the ether as ordinarily manufactured; exposure to light, particularly direct sunlight; and heat, especially when the ether is in a sealed vessel. A small proportion of these oxidative impurities suffices to render the ether unfit for anesthetic use, and otherwise diminishes its value.

It is the object of this invention to provide a method and a package whereby oxygen may be removed from ether in order to prevent the formation of oxidative impurities therein and so to keep the ether suitable for inducing anesthesia.

In the practice of this invention the ether to be treated is contacted, preferably under anaeric conditions, with a substance selected from the class consisting of metallic iron, including oxidizable alloys of iron, and ferrous compounds, the substance being preferably used in a form presenting a large surface. Among the substances efficacious for the purpose are: sheet-iron and steel container-linings, iron and steel wire, nails, card teeth, borings, lathe turnings, and filings; and ferrous chloride, hydroxide, oxide, and sulfate, preferably deposited on the interior of the container, as by means of a phenol-formaldehyde condensate, or used to impregnate material introduced into the container. Apparently iron in the metallic and ferrous states possesses a greater affinity for oxygen than does ether, and is therefore able to combine with the dissolved oxygen in preference to the ether. Whatever may be the correct theory of their operation, substances selected from the class consisting of metallic iron and ferrous compounds remove dissolved oxygen from ether and, even under such adverse conditions as the presence of light and heat, maintain such ether virtually free from oxidative impurities for an indefinite period.

As an example, (a) one yard of 25-gage steel tape or wire, coiled, or (b) a sheet of filter paper, 6 inches long and two inches wide, that has been impregnated with a 10% solution of ferrous sulfate and dried anaerically, may be confined with a quarter-pound of ether in an ordinary sealed tin container.

As a further example, ether may be subjected anaerically to slow percolation through iron filings.

Figure 2:
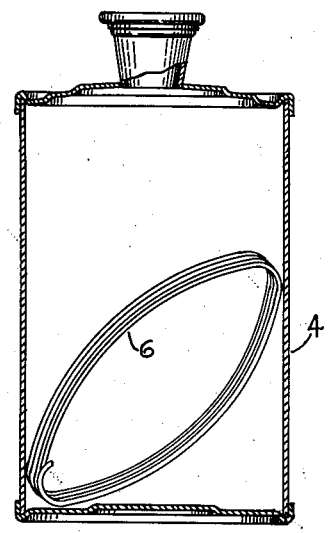
Figure 3:
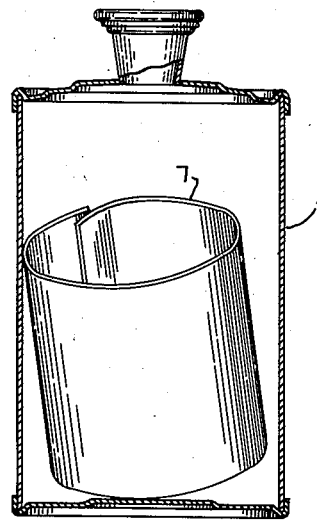

Packages embracing several modifications of the invention are illustrated, in partial vertical section, in the accompanying drawing, wherein 4 indicates a tin-plate container: in Figure 1, 5 represents a sheet-iron or steel lining or a film of phenol-formaldehyde condensate having a ferrous compound at its surface; in Figure 2, 6 represents a coil of steel wire; and in Figure 3, 7 represents a sheet of filter paper impregnated with ferrous sulfate.

It will be understood that the specific details herein set forth are merely illustrative and by no means limitative of the invention, which may be variously otherwise embodied—for instance as to the particular forms of metallic iron or the ferrous compounds used, the modes of applying them to the ether, and the packages employed—within the scope of the appended claims.

I claim:

1. A package comprising a container having therein ether and metallic iron.

2. A package comprising a container having therein ether and steel wire.

3. The process that comprises percolating ether anaerically through iron filings.

4. A package comprising a container having therein ether and a substance selected from the class consisting of metallic iron and oxidizable alloys of iron.

5. A package comprising a container having therein ether and wire formed of a substance selected from the class consisting of metallic iron and oxidizable alloys of iron.

6. A package comprising a container having therein ether and wire formed of a substance selected from the class consisting of iron and steel.

7. A package comprising a container having therein ether and iron wire.

FERDINAND W. NITARDY.